United States Patent [19]

Marto

[11] 4,243,342
[45] Jan. 6, 1981

[54] SNAP FAST FASTENER

[75] Inventor: John H. Marto, Oshkosh, Wis.

[73] Assignee: J. I. Case Company, Racine, Wis.

[21] Appl. No.: 61,346

[22] Filed: Jul. 27, 1979

[51] Int. Cl.³ .............................................. F16B 21/00
[52] U.S. Cl. .................................... 403/324; 403/328; 280/515
[58] Field of Search ...................... 403/327, 328, 324; 280/515; 85/5 CP

[56] References Cited

U.S. PATENT DOCUMENTS 3,281,164 10/1966 Reaser ............................. 403/324 X

FOREIGN PATENT DOCUMENTS 1111516 7/1961 Fed. Rep. of Germany ........... 280/515
691732 7/1930 France ..................................... 403/327

Primary Examiner—Andrew V. Kundrat
Attorney, Agent, or Firm—Cullen, Sloman, Cantor, Grauer, Scott & Rutherford

[57] ABSTRACT

A fastener assembly is disclosed for connecting an attachment to a frame. The fastener assembly is mounted to a frame portion of, for example, a garden-type tractor. The fastener includes a pin holder, latch pin, and torsion spring. The torsion spring includes two leg portions and a coil portion which is between and integral with the leg portions. The torsional spring secures the latch pin to the pin holder, and it is in constant tension when the latch pin is engaged and disengaged. The attachment is connected to the frame by aligning an opening in the attachment with the latch pin and pushing the latch pin to engage or pulling the latch pin to disengage. When the latch pin is disengaged, the spring coil is compressed and applies an outward force to keep the pin disengaged, and when the latch pin is pushed towards its engaged position, the spring coil resists until it snaps over-center and then it urges the latch pin into locking engagement.

3 Claims, 3 Drawing Figures

SNAP FAST FASTENER

BACKGROUND OF THE INVENTION

The present invention relates to a fastener device and, more particularly, to a torsion spring snap fastener for connecting attachments to a frame.

There are numerous occasions when it is desired to temporarily connect an attachment or the like to a frame. For example, a number of attachments are available for use with small garden-type tractors including mower decks, wagons, power implements, etc. A typical method of connecting these attachments to the tractor is by removable pins, bolts, or clips. This can be a nuisance because when the attachment is not in use, the operator typically stores the fastener where it either becomes lost or misplaced. Thus, there has been a need for a fastener that remains attached to the frame of the vehicle and which is readily available and simple to use when it is desired to connect an attachment to the frame.

Another problem with many existing fastener devices is that tools are required to make the hook-up between the attachment and the frame. There has been a need for a fastener which is simple in operation and which does not require tools during the hook-up procedure.

The disadvantages of present fastener devices have resulted in the spring snap fastener in the present invention which only requires the operator to push on the latch pin to engage and pull on the latch pin to disengage.

SUMMARY OF THE INVENTION

In accordance with the present invention, a fastener is provided for connecting an attachment to a frame.

The fastener assembly of the present invention is mounted to a portion of the frame of, for example, a garden-type tractor. The fastener assembly includes a pin holder, latch pin, and torsion spring. The pin holder is mounted to the frame, and the latch pin passes through an opening in the pin holder and is secured to the pin holder by the torsional spring. To lock an attachment to the frame, an opening in the attachment mounting plate is aligned with the latch pin, and the pin is pushed inwardly to an engaged position. The pin is unlocked by pulling on it. The fastener assembly is attached to the frame for the convenience of the operator so that it is readily available when it is desired to connect an attachment to the frame.

The torsion spring is designed to snap over-center and apply force to the latch pin in both its latched and unlatched positions. The spring includes a "J" shaped leg portion which is fitted into an opening in the pin holder and a relatively straight leg portion which passes through a transverse opening in the latch pin. An integral coil portion between the two leg portions of the spring provides the force to the latch pin in both directions of its movement.

The advantages of the present construction are few parts, no tools being required to assemble the parts, and parts which are simple to manufacture. Further, no tools are required to make the hook-up between the attachment and the frame. The operator merely pushes the latch pin to lock the attachment on the frame and pulls the latch pin to unlock the attachment from the frame.

An important feature of the present invention resides in the torsional spring which is in constant tension whether the latch pin is engaged or disengaged. When the latch pin is disengaged, the spring coil applies an outward force to keep the pin disengaged. When the latch pin is pushed inwardly towards an engaged position, the spring coil resists until it snaps over-center, and then, the spring coil urges the latch pin into locking engagement with the opening in the attachment mounting plate. Thus, the spring applies a force to the latch pin both in its engaged and disengaged positions.

Another feature provided by the spring is that the relatively straight leg portion acts as a stop for the latch pin when it is latched or unlatched. In the unlatched position, the straight leg portion abuts a downwardly extending leg portion of the pin holder, and when the pin is in its latched position, the spring leg abuts a portion of the frame.

Other advantages and meritorious features of the fastener assembly of the present invention will be more fully understood from the following description of the preferred embodiment, the appended claims, and the drawings, a brief description of which follows.

DESCRIPTION OF THE PREFERRED EMBODIMENT

Figure 1:
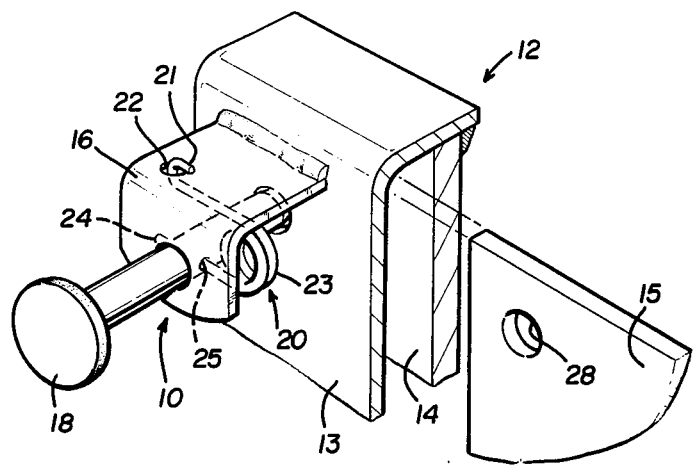
FIG. 1 is a perspective view of the fastener assembly of the present invention mounted to a frame portion and illustrating a portion of an attachment which may be connected to the frame.
Figure 2:
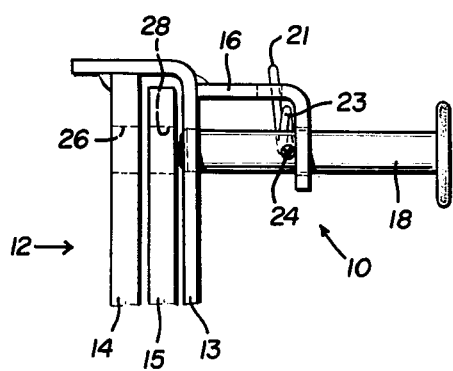
FIG. 2 is a side elevational view of the fastener assembly illustrated in FIG. 1 in its unlatched position.
Figure 3:
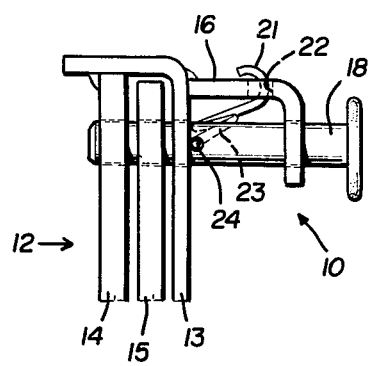
FIG. 3 is a side elevational view of the fastener assembly of FIG. 1 in its latched position.

A preferred embodiment of the fastener made in accordance with the teachings of the present invention is illustrated in FIGS. 1–3.

Referring to FIG. 1, the fastener assembly 10 is mounted to frame portion 12 which includes vertical leg portions 13 and 14. Frame portion 12 may be part of the frame of a powered garden-type tractor, riding lawn mower, or the like where it is desired to connect an attachment to the frame.

A mounting plate 15 of an attachment is illustrated which fits between vertical leg portions 13, 14 of frame 12 and is connected to the frame by the fastener assembly 10 of the present invention.

The fastener assembly 10 includes a pin holder 16, latch pin 18, and torsion spring 20. Pin holder 16 is welded or otherwise secured to leg 13 of frame portion 12. Latch pin 18 passes through an opening in pin holder 16 and is secured thereto by torsion spring 20.

Torsion spring 20 includes a "J" shaped leg portion 21 which is fitted into opening 22 in pin holder 16. A relatively straight leg portion 24 of the spring passes through a transverse opening 25 in latch pin 18. Coil portion 23 is integral with and separates the leg portions 21 and 24.

The fastener assembly 10 is shown in its unlatched condition in FIGS. 1 and 2 and in its latched condition in FIG. 3. For latching, opening 28 in attachment mounting plate 15 is aligned with opening 26 through legs 13, 14, and latch pin 18 is pushed inwardly from the position shown in FIGS. 1 and 2 to the position shown in FIG. 3.

An important feature of the present invention resides in the torsional spring 20 which is always in tension whether the latch pin 18 is engaged or disengaged. The attachment points securing the spring permit it to rotate but keep the spring in constant tension. The curled end of "J" shaped leg 21 undergoes a limited amount of pivotal movement within pin holder opening 22 as the pin is moved from an unlatched to a latched position while preventing the spring from becoming unattached from the pin holder. Similarly, spring leg 24 rotates in latch pin opening 25 as the latch pin is moved from the position illustrated in FIG. 2 to the position illustrated in FIG. 3. Spring coil 23 which is integral with and between spring legs 21 and 24, maintains a constant force on latch pin 18 in either its latched or unlatched positions.

The snap over-center point for the spring is approximately on the center line which passes through pin holder opening 22. When the latch pin is disengaged, spring coil 23 is compressed, and it applies an outward force to keep the pin disengaged. When the latch pin is pushed towards an engaged position, the spring coil 23 resists until the spring snaps over-center, and then, coil 23 urges latch pin 18 into engagement as illustrated in FIG. 3. As the spring moves over-center when pin 18 is pushed inwardly, the curled end of leg 21 rotates from a position substantially parallel with frame leg 31 as illustrated in FIGS. 1 and 2 to a position substantially perpendicular to leg 13 illustrated in FIG. 3. This rotative movement of the curled end of leg 21 within pin holder opening 22 permits coil 23 to expand as illustrated in FIG. 3 to thereby exert a thrust force on pin 18 for latching engagement. Thus, spring 20 applies a force to latch pin 18 in both its engaged and disengaged positions.

Another feature provided by spring 20 is that spring leg 24 acts as a stop for latch pin 18 when it is latched or unlatched. In the unlatched position illustrated in FIGS. 1 and 2, spring leg 24 abuts the downwardly extending leg portion of pin holder 16, and in the latched position illustrated in FIG. 3, spring leg 24 abuts leg 13 of frame portion 12.

It will be apparent to those skilled in the art that the foregoing disclosure is exemplary in nature rather than limiting, the invention being limited only by the appended claims.

I claim:

1. A fastener assembly for connecting an attachment having a mounting plate to a frame comprising:
   a pin holder mounted to a leg portion of said frame;
   a latch pin movable through an opening in said frame leg portion for insertion in and engagement with an opening in said attachment mounting plate, said latch pin being secured to said pin holder by torsion spring means;
   said torsion spring means including a first leg portion, a coil portion, and a second leg portion, said coil portion being between and integal with said leg portions, said first leg portion being rotatably mounted to said pin holder and said second leg portion being rotatably mounted to said latch pin, said first leg portion is generally "J" shaped and having a curled end portion which is rotatably mounted within an opening in said pin holder, and said second leg portion being elongated and rotatably mounted within a transverse opening in said latch pin; and
   said torsion spring means applying a force to said latch pin when said latch pin is either engaged within said opening in said attachment mounting plate or disengaged from said opening in said attachment mounting plate.

2. The fastener assembly as defined in claim 1 wherein said torsion spring means being compressed when said latch pin is disengaged to apply a force for keeping said latch pin disengaged, said torsion spring means being movable over-center as said latch pin is moved towards its engaged position, said curled end portion of said "J" shaped leg portion being rotatable within said pin holder opening from a position substantially parallel with said frame leg portion when said latch pin is disengaged to a position wherein said curled end is substantially perpendicular to said frame leg portion when said latch pin is engaged, said rotative movement of said curled end portion permitting said torsion spring coil portion to expand as said latch pin is moved towards its engaged position to thereby apply a thrust force on said latch pin for latching engagement.

3. The fastener assembly as defined in claim 2 wherein said second leg portion of said torsion spring means is transverse to the longitudinal axis of said latch pin to act as a stop for said latch pin, said second leg portion abutting said frame leg portion when said latch pin is engaged and said second leg portion abutting a portion of said pin holder when said latch pin is disengaged.

* * * * *